Patented May 6, 1952

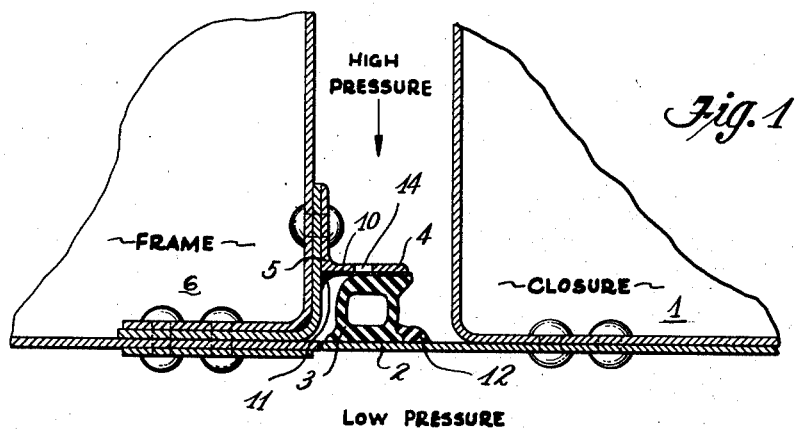
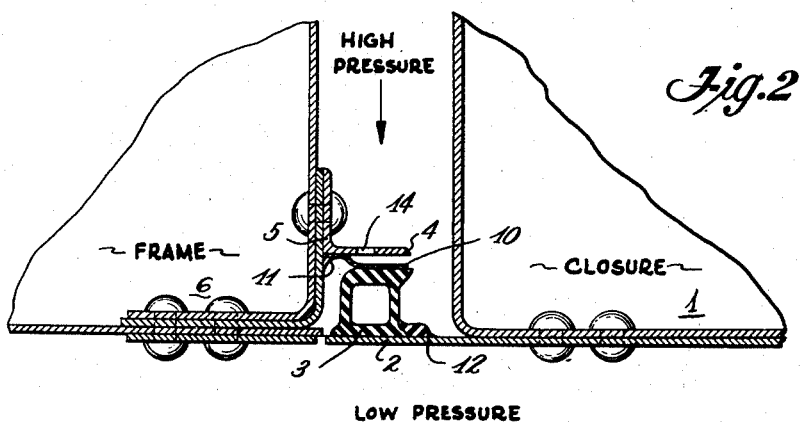

2,596,045

UNITED STATES PATENT OFFICE 2,596,045

PRESSURE SEAL

Vernon L. Rogallo, Culver City, Calif., assignor to Northrop Aircraft, Inc., Hawthorne, Calif., a corporation of California Application October 19, 1946, Serial No. 704,430

4 Claims. (Cl. 20—69)

My invention relates to pressure closures and more particularly to pressure closures or doors ideally suitable for use in the construction of pressurized airplane cabins, for example.

Many modern airplanes are designed to operate at relatively high altitudes, such as 20,000 to 30,000 feet. For the comfort and safety of the carried personnel, both crew and passengers, the cabins of such airplanes are sealed and pressurizer while in flight to simulate air pressure conditions at lower altitudes. In consequence, the doors and hatches of such cabins must be provided with effective seals to prevent any substantial pressure leakage while in flight. At the same time, such doors and hatches must be readily openable in emergencies and must, as far as possible, maintain their seal under mismating conditions such as might be encountered while undergoing stresses or shock, for example, in military airplanes. Furthermore, the seal must be maintained under extreme temperature ranges and conditions as would be encountered at high altitudes.

Heretofore, the problem of maintaining a satisfactory seal under mismating conditions of door and frame has been partially solved by making doors and hatches open inwardly so that the cabin pressure forces the door against the frame. By the use of a flexible gasket a seal can then be obtained under slight mismating conditions, if the gasket remains flexible.

However, inwardly opening doors have many disadvantages. The cabin pressure tends to keep the door closed and both force and time are required to open the door against the inner pressure. In emergency openings the door is inside and may thus hamper exit of personnel. It is thus highly desirable that at least all emergency doors open outwardly so that the cabin pressure will aid in opening the doors, rather than hinder it.

Both under normal and mismating conditions, the sealing problem is much greater with outwardly opening doors than with those opening inwardly, and it is an object of the present invention to provide a pressure closure that will open outwardly, if desired, but which will at the same time maintain a pressure seal even under mismating conditions.

However, even with inwardly opening doors, a pressure seal is difficult to maintain at low temperatures when flexible gaskets are used, because most gasket materials freeze and lose their flexibility at temperatures of minus 60° F., for example. Even a slight mismating under these circumstances will cause leakage, and it is another object of my invention to provide a pressure seal that will operate to maintain a seal, even though no flexible gasket is present.

Other objects and advantages of the present invention will be more fully understood by reference to the appended drawings in which:

Figure 1 is a sectional view of a pressure seal joint embodying one preferred form of the present invention under normal mating conditions.

Figure 2 is a sectional view of the joint of Figure 1 under severe mismating conditions illustrating seal maintenance.

The invention is illustrated as applied to an emergency crew escape hatch in a high speed military bomber designed to operate up to 30,000 feet altitude with a cabin pressure equivalent to that at from sea level to 10,000 feet. Under these conditions the closure or hatch 1 as shown in Figure 1 is of metal, having an edge overlap portion 2 carrying a cushion gasket 3 preferably hollow and of rubber or similar elastic composition. Opposed to gasket 3 is a jamb member 4, in this case formed by an angle member 5 riveted to the airplane frame 6. This hatch will open outwardly, and using the gasket alone a pressure seal can only be maintained under substantially perfect mating conditions, as when the gasket 3 is under substantially uniform compression all around the closure.

As uniform compression of gasket 3 is difficult to obtain even when the parts are new, and impossible to obtain when either closure 1 or frame 6 is warped, even slightly, or if the gasket 3 is hard and frozen, it is not sufficient to rely on gasket sealing alone. This is particularly true with outwardly opening doors, where high differential pressures may cause the door to move outwardly. It should be noted in this regard that both high differential pressures and low temperatures are usually encountered at high altitudes.

In consequence, I have provided a seal construction that will maintain a seal even after gasket 3 has hardened and/or moved a substantial distance away from jamb 4, as shown in Figure 2.

A flap 10 of thin fabric, such as cotton, coated on both sides with a vinyl resin, is attached to frame 6 at the base of angle member 5 to lie flat against jamb 4 between jamb 4 and gasket 3. Such a flap has been found to remain flexible at minus 65° F. The attachment line of the flap 10 to frame 6 is sealed by a fillet 11 of plastic material and gasket 3 is likewise sealed with a plastic fillet 12 along the inner edge of the gasket where it contacts closure 1. Jamb 4 is perforated with holes 14 to permit pressure to contact the back of flap 10. Ridges or channels in the face of jamb 4 facing the flap 10 and opening into the pressure chamber are deemed full equivalents to holes 14.

As shown in Figure 2, when the closure and frame are mismated for any reason whatever while the cabin is pressurized, the closure edge may, at some points at least, move away from frame 6 sufficiently to move gasket 3 away from jamb 4. This is particularly apt to happen if the gasket has lost its resiliency due to freezing.

Flap 10 in this case is forced, by the chamber pressure, firmly against the inner face of gasket 3, thus maintaining the seal. This seal will not be broken until the parts are separated sufficiently so that flap 10 can no longer lie flat on the inner surface of gasket 3 with sufficient grip to maintain a proper seal. As flap 10 is flexible, relative motion of closure and frame can also take place within wide limits without loss of pressure.

The compositions of gasket 3 and flap 10 are not critical, although the sealing surfaces should not be deliberately made slippery or polished. Contact of rubber and similar materials, even when hardened, with the flap provides a preferred coefficient of friction to maintain a seal to follow the gasket on outward movement thereof, even at minus 65° F.

Seals of the type described have been rigorously tested under low temperature conditions. A hatch made as described has been removed and replaced many times at temperatures as low as minus 65° F., with pressurization taking place immediately after replacement. No flexibility of gasket 10 could be detected at this temperature, yet the seal did not leak. Thus, it is apparent that the seal does not depend on the flexibility of the gasket, and that, if desired, gasket 10 can originally be of hard material with the entire seal predicated on the flap contact at all times. Thus, the flap contact surface can be metal, if desired.

It is to be noted that while I have described my invention as applied to doors or hatches of pressurized airplane cabins, the seal of the present invention is applicable to any joint between high and low pressure volumes where relative movement may take place between the joint members.

It is also to be understood that the reciprocal to the arrangement of gasket and flap shown herein is fully equivalent.

I claim:

1. A pressure seal for closures for a pressurized chamber comprising cooperating, parallel and normally closely adjacent surfaces, one of said surfaces being on said closure, the other of said surfaces being on said chamber, said surfaces being subject to separation substantially at right angles to their extent to cause a leakage path between said surfaces from the high pressure side to the low pressure side of said closure, and a thin, flexible, and airtight flap positioned between said surfaces and normally in contact with both of said surfaces over a substantial area of each, said flap being attached to one of said surfaces only at a low pressure edge of said latter surface to extend freely along said latter surface, whereby when said separation occurs said flap is flexed and held by air pressure alone against the original contact area of the other surface to bridge and seal said leakage path.

2. A pressure seal for a closure for a pressurized chamber comprising means forming a first flap contacting surface attached to said chamber, a gasket of resilient material attached to said closure and having a second flap contacting surface thereon opposed and parallel to said first flap contacting surface when said closure is closed, said closure while being opened separating said flap contacting surfaces substantially at right angles to their extents, and a thin, flexible and airtight flap attached to and sealed to said chamber only at the low pressure edge of said first flap contacting surface and extending freely and outwardly between said flap contacting surfaces, said closure being normally positioned when closed to force said flap against the extent of both of said flap contacting surfaces by virtue of the resiliency of said gasket, whereby when separations of said surfaces due to mismating of said closure and chamber occur, said flap will be maintained by air pressure alone against the flat flap contacting surface on said gasket to provide a bridge and a seal across the separation gap.

3. Apparatus in accordance with claim 1 wherein the surface on the high pressure side of said flap is cut away at spaced intervals to create passages conducting pressure directly to the high pressure side only of said flap between the attachment and the free end thereof.

4. Apparatus in accordance with claim 2 wherein said means forming said first flap surface is apertured at spaced intervals to create passages conducting pressure directly to the high pressure side only of said flap between the attachment and the free end thereof.

VERNON L. ROGALLO.

REFERENCES CITED

The following references are of record in the file of this patent:

UNITED STATES PATENTS

| Number | Name | Date |
| --- | --- | --- |
| 1,712,472 | Campbell | May 7, 1929 |
| 2,146,259 | Gretener | Feb. 7, 1939 |
| 2,361,298 | Laddon | Oct. 24, 1944 |
| 2,443,751 | Terepin et al. | June 22, 1948 |
| 2,444,114 | Pevney | June 29, 1948 |